(12) United States Patent
Moore (10) Patent No.: US 10,114,918 B2
(45) Date of Patent: Oct. 30, 2018

(54) PHYSICAL PLACEMENT CONTROL FOR AN INTEGRATED CIRCUIT BASED ON STATE BOUNDS FILE

(71) Applicant: ARM Limited, Cambridge (GB)

(72) Inventor: Stephen Lewis Moore, Austin, TX (US)

(73) Assignee: ARM Limited, Cambridge (GB)

(*) Notice: Subject to any disclaimer, the term of this patent is extended or adjusted under 35 U.S.C. 154(b) by 169 days.

(21) Appl. No.: 15/008,000

(22) Filed: Jan. 27, 2016

(65) Prior Publication Data

US 2017/0212975 A1 Jul. 27, 2017

(51) Int. Cl.
*G06F 17/50* (2006.01)

(52) U.S. Cl.
CPC ........ *G06F 17/5072* (2013.01); *G06F 17/505* (2013.01); *G06F 17/5077* (2013.01); *G06F 2217/12* (2013.01)

(58) Field of Classification Search
CPC .............. G06F 17/5072; G06F 17/505; G06F 17/5077; G06F 2217/12
See application file for complete search history.

(56) References Cited

U.S. PATENT DOCUMENTS

| | | | | |
|---|---|---|---|---|
| 5,850,348 A | * | 12/1998 | Berman | G06F 17/50 707/999.202 |
| 6,698,004 B2 | * | 2/2004 | Satish | G01R 31/318342 703/17 |
| 6,742,164 B1 | * | 5/2004 | Gillam | G06F 17/2755 715/200 |
| 7,076,416 B2 | * | 7/2006 | Chen | G06F 17/5022 703/13 |
| 7,249,330 B2 | * | 7/2007 | Roesner | G06F 17/5022 716/106 |
| 7,960,759 B2 | | 6/2011 | Frederick et al. | |
| 8,051,400 B2 | | 11/2011 | Frederick | |
| 8,136,072 B2 | | 3/2012 | Frederick | |
| 8,645,893 B1 | | 2/2014 | Yeung et al. | |
| 8,701,070 B2 | | 4/2014 | Chuang et al. | |
| 8,726,205 B1 | | 5/2014 | Khan et al. | |

(Continued)

OTHER PUBLICATIONS

PCT International Search Report and Written Opinion; PCT/GB2017/050097; dated May 16, 2017.

(Continued)

*Primary Examiner* — Naum B Levin
(74) *Attorney, Agent, or Firm* — Pramudji Law Group PLLC; Ari Pramudji (57) ABSTRACT

Various implementations described herein are directed to systems and methods for controlling physical placement of a circuit design. The systems and methods may extract state groups of the circuit design by deriving state groups from each logical hierarchy of the circuit design. At each level, available state points may be grouped by similarity and stored in a state groups collection alongside grouping terms. The systems and methods may generate a state bounds file that bounds locations of the state points in the circuit design. The state bounds file may be based on the extracted state groups and the grouping terms stored in the state groups collection. The systems and methods may control physical placement of the circuit design using the state bounds file.

24 Claims, 7 Drawing Sheets

(56) References Cited

U.S. PATENT DOCUMENTS

| | | | |
|---|---|---|---|
| 8,769,450 B1* | 7/2014 | Tian | G06F 17/504 |
| | | | 716/103 |
| 8,782,591 B1 | 7/2014 | Ku et al. | |
| 8,838,559 B1* | 9/2014 | O'Riordan | G06F 8/38 |
| | | | 707/601 |
| 8,863,052 B1* | 10/2014 | Dhuria | G06F 17/5036 |
| | | | 716/108 |
| 8,898,618 B2* | 11/2014 | Chin | G06F 3/0482 |
| | | | 703/13 |
| 8,959,472 B1 | 2/2015 | Frederick, Jr. et al. | |
| 2005/0273450 A1* | 12/2005 | McMillen | G06K 9/00973 |
| 2012/0036488 A1 | 2/2012 | Arunachalam et al. | |
| 2012/0151423 A1* | 6/2012 | Baumgartner | G06F 17/504 |
| | | | 716/107 |
| 2013/0047127 A1 | 2/2013 | Arunachalam | |
| 2014/0075404 A1* | 3/2014 | Chuang | G06F 17/5072 |
| | | | 716/122 |
| 2015/0143309 A1 | 2/2015 | De Dood et al. | |

OTHER PUBLICATIONS

Integrated Circuit Design; Wikipedia; Dec. 8, 2015. https://en.wikipedia.org/w/index.php?title=integrated_circuit_design&oldid=694307295.

Standard Cell; Wikipedia; Dec. 8, 2015. https://en.wikipedia.org/w/index.php?title=standard_cell&oldid=694356003.

VHDL Naming Conventions; ETH Zurich—D-ITET—Microelectronics Design Center; Mar. 2, 2015. https://www.dz.ee.ethz.ch/en/information/hdl-help/vhdl-naming-conventions.html.

* cited by examiner

PHYSICAL PLACEMENT CONTROL FOR AN INTEGRATED CIRCUIT BASED ON STATE BOUNDS FILE

BACKGROUND

This section is intended to provide information relevant to understanding various technologies described herein. As the section's title implies, this is a discussion of related art that should in no way imply that it is prior art. Generally, related art may or may not be considered prior art. It should therefore be understood that any statement in this section should be read in this light, and not as any admission of prior art.

In the electronics manufacturing industry, electronic design automation (EDA) generally refers to software tools for designing electronic systems, such as printed circuit boards (PCBs) and integrated circuits (ICs). These software tools are used by designers to design and analyze entire semiconductor chips. In semiconductor design, standard cell methodology provides for a system of methods, principles, and rules for designing digital-logic features and behaviors of integrated circuits. This standard cell methodology allows for design abstraction, where one designer may focus on high-level logical function of a digital design, while another designer may focus on physical implementation of the digital design. Along with advances in semiconductor manufacturing, this standard cell methodology assists designers with designing integrated circuits from single-function IC devices to complex system-on-a-chip (SoC) devices.

Figure 1A:
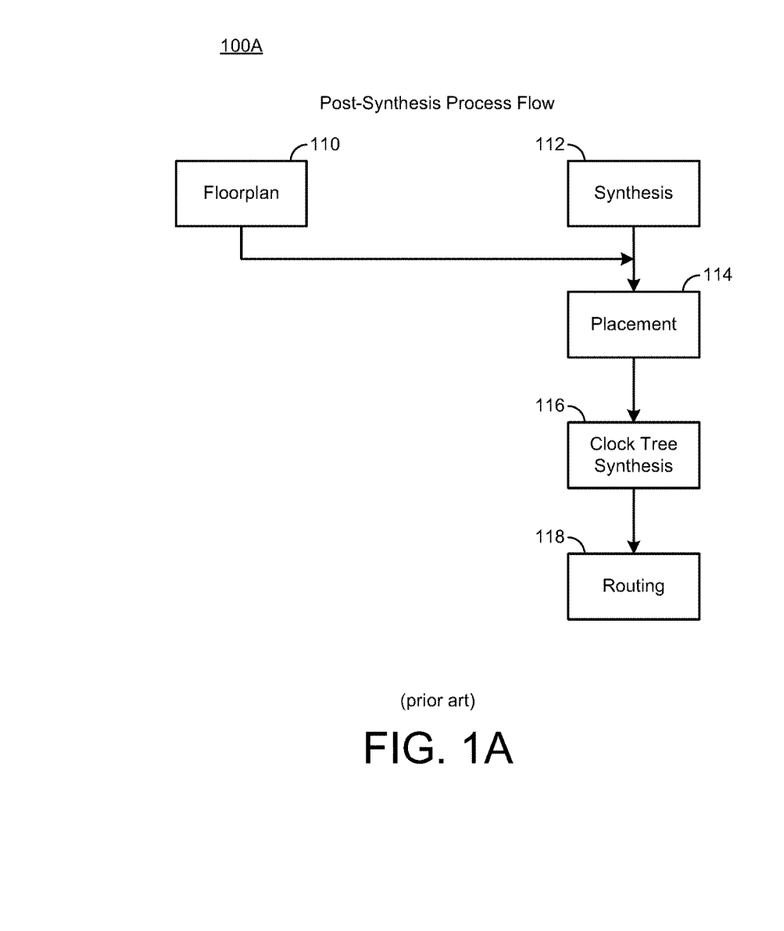
FIGS. 1A-1B illustrate diagrams of conventional placement flows as known in the art.
Figure 1B:
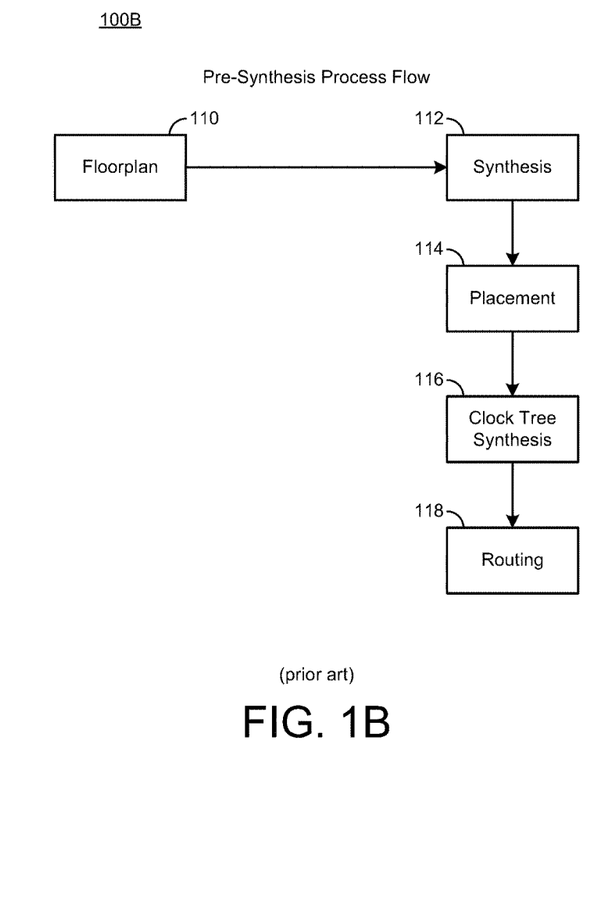

FIGS. 1A-1B illustrate diagrams of conventional placement flows as known in the art. In reference to physical design, FIG. 1A illustrates a diagram of a conventional post-synthesis process flow 100A as known in the art, wherein a floorplan 110 of a design may be provided after synthesis 112 of the design. Further, FIG. 1B illustrates another diagram of a conventional pre-synthesis process flow 100B as known in the art, wherein the floorplan 110 of a design may be provided prior to synthesis 112 of the design.

Generally, a typical process flow provides for various operations related to an integrated circuit design, including a floorplan 110, synthesis 112, placement 114, clock tree synthesis 116 and routing 118. The floorplan 110 refers to some gross floor planning choices of the design, such as location of memories, ports, etc. In some cases, synthesis 112 may refer to logic synthesis, which is a process by which an abstract form of desired circuit behavior at register transfer level (RTL) is used to implement a design in terms of logic gates. In other cases, synthesis 112 may refer to high-level synthesis, which is an automated design process that interprets an algorithmic description of a desired behavior and generates digital hardware to implement that behavior. Further, placement 114 refers to assigning locations for various circuit components within a chip area. Clock tree synthesis (CTS) 116 refers to a process of determining various timing patterns of the physical design, including timing skew and delay. Routing 118 refers to a process of allocating routing resources that are used for connections, assigning routes to specific metal layers, and routing tracks within the routing resources.

BRIEF DESCRIPTION OF THE DRAWINGS

Implementations of various techniques are described herein with reference to the accompanying drawings. It should be understood, however, that the accompanying drawings illustrate only various implementations described herein and are not meant to limit embodiments of various techniques described herein.

DETAILED DESCRIPTION

Various implementations described herein are directed to controlling physical placement of a design, such as, e.g., an integrated circuit layout design. For instance, various implementations described herein refer to a placement director (PD) technique that provides improved placement control via state group bounding. This technique may provide for a reduction in placement search space by automatic derivation and application of state point group bounds for purposes of reducing inter-trial placement variability and improving quality of results. Controlling the physical placement of a design may also be used to improve performance of an integrated circuit. Historically, some improvement has been achieved with use of macro and port locations in conjunction with instance bounds and hierarchical bounds. However, the placement director (PD) technique as described herein may improve conventional techniques by utilizing automatically derived state group bounds to control physical placement of a design while maintaining placement fluidity.

Various implementations of controlling placement of a physical design will now be described in greater detail herein with reference to FIGS. 2A-6.

Figure 2A:
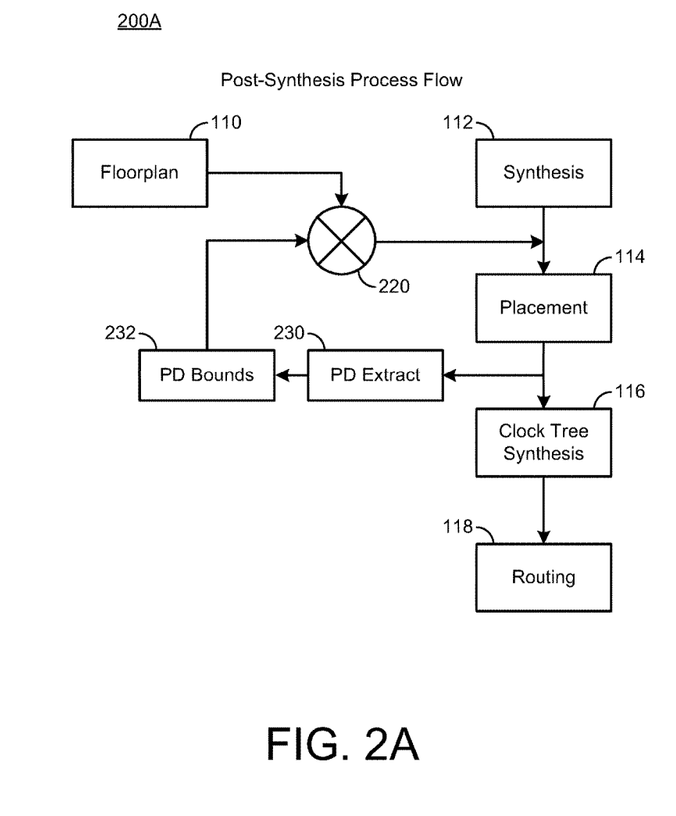
FIGS. 2A-2B illustrate various placement director flow diagrams for physical placement of a design in accordance with various implementations described herein.
Figure 2B:
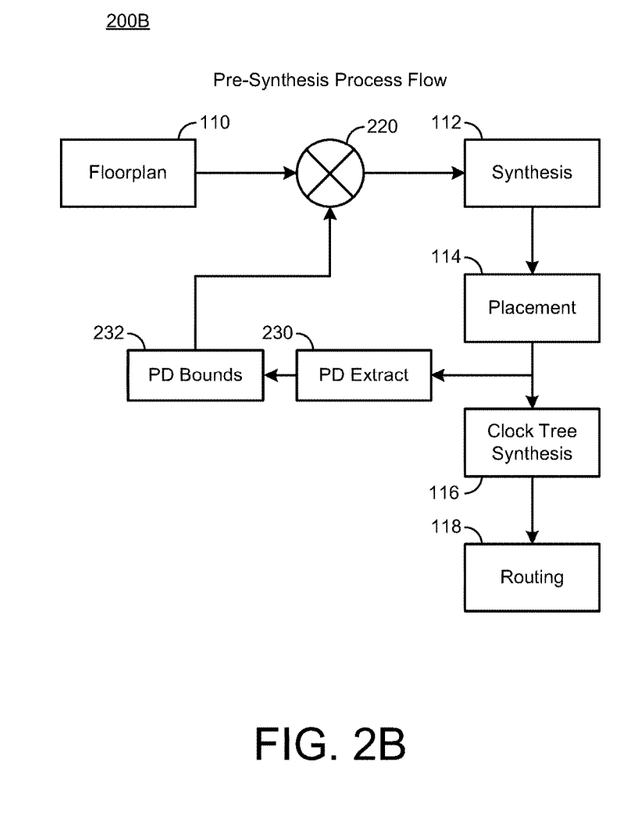

FIGS. 2A-2B illustrate various placement director flow diagrams for physical placement of a design in accordance with various implementations described herein. In particular, FIG. 2A may refer to post-synthesis process flow 200A for implementing the placement director (PD) for physical placement of a design, and FIG. 2B may refer to pre-synthesis process flow 200B for implementing the placement director (PD) for physical placement of a design. In some cases, the post-synthesis process flow 200A of FIG. 2A may refer to basic implementation, and the pre-synthesis process flow 200B of FIG. 2B may refer to physically aware synthesis.

In reference to FIG. 2A, the post-synthesis process flow 200A may refer to a method for controlling physical placement of a design, such as, e.g., an integrated circuit layout design of memory, ports, standard cells, etc., which may be selected from a library, such as, e.g., a standard cell library.

After placement 114, the method may include a PD extraction operation 230 that provides for extracting state groups of the design by deriving state groups from each logical hierarchy of the design. In some cases, at each level, available state points may be grouped by similarity and stored in a state groups collection alongside grouping terms. In some cases, grouping terms may refer to expressions or regular expressions that may be used to group similar state points by their instance names. Further explanation for grouping terms is provided herein below in reference to FIG. 4. After PD extraction 230, the method may include a PD bounds operation 232 that may provide for generating a state bounds file that bounds locations of the state points in the design. In some cases, the state bounds file may be based on the extracted state groups and the grouping terms stored in the state groups collection. After generating PD bounds 232, the method may include modifying 220 the floorplan 110 based on the state bounds file thereby controlling physical placement of the design using the state bounds file during another iteration of placement 114.

In reference to FIG. 2B, the pre-synthesis process flow 200B may refer to another method for controlling physical placement of a design, such as, e.g., an integrated circuit layout design. This method may include performing the PD extraction operation 230 after a first iteration of synthesis 112. Further, after PD extraction 230, the PD bounds operation 232 may be performed. After PD bounds generation 232, the floorplan 110 may be modified 220 based on the state bounds file thereby controlling physical placement of the design using the state bounds file during another iteration of synthesis 112.

In some implementations, this placement director (PD) technique may refer to an internal implementation of automated state group bounds. Further, this PD technique may include two components: extraction and bound generation. Once initial state point bounds have been generated, they may be applied earlier in a flow (e.g., pre-placement or pre-synthesis), and they may be used to re-place a design (e.g., an integrated circuit layout design) with a reduced search space. Further, loops or iterations of the placement director may be possible to continue this annealing, and for larger changes, some state bounds may be deleted or removed to widen the placement search space. Thus, in some cases, controlling physical placement of the design using the state bounds file may include introducing a reduced search space for the available state points that are grouped by similarity and stored in the state groups collection based on the state bounds file prior to synthesis of the design, or in some other cases, after synthesis of the design. However, in various other cases, a reduced search space may be introduced before or after any stage of the design process, such as, e.g., before or after placement, before or after clock tree synthesis, and/or before or after routing.

In some implementations, PD extraction 230 may refer to an extraction stage of placement director (PD) that is configured to loop through each level of logical hierarchy in the design. At each level, any available state points may be extracted and stored in a collection, such as, e.g., the state groups collections or a state bounds collection. In some cases, the state groups may be automatically derived from each logical hierarchy of the design. Further, in some other cases, extracting state groups of the design may include iterating through each level of each logical hierarchy of the design so as to derive the state groups from each logical hierarchy of the design.

After PD extraction 230, PD bound generation 232 may be performed. In some implementations, PD bound generation 232 may refer to a bounds generation stage of placement director (PD) that is configured to loop over the extracted state groups to thus generate bounds for the state bounds file. In some cases, generating the state bounds file may include iterating through the extracted state groups in the state groups collection so as to generate state group bounds for bounding the locations of the state points in the design. In some other cases, generating the state bounds file may include iterating through the extracted state groups in the state groups collection so as to reduce the state group collection by removing redundant state points. Further, in some implementations, reducing the state groups collection may include matching instance names in the state groups collection with selections of regular expressions, using the matched instance names to generate grouping expressions for extracting state groups, and/or using the regular expressions to remove redundant state points in each state group from the state groups collection. In some cases, reducing the state groups collection may include generating a state group for a single instance if no match exists with one or more of the grouping expressions. In some other cases, generating the state bounds file may include storing the regular expression along with the logical hierarchy.

In some implementations, generating state group files may refer to generating state group bounds, which may include evaluating the physical placement of the design and extracting information related thereto. Further, this extraction of information may be formatted for use with controlling synthesis or any other level of implementing a design, such as, e.g., placement, clock tree synthesis, and/or routing. The extracted information may refer to and thus include technology size (e.g., nm), speed of cells, number of logic levels (e.g., number of gates in paths), and distance between state points (e.g., start and stop points of registers, or various other types of cells configured to hold state values, such as logic 0 or 1). In accordance with various implementations described herein, this extracted information may be used for controlling physical placement of a design.

In some implementations, controlling physical placement of the design using the state bounds file may include introducing a reduced search space based on the state bounds file prior to synthesis of the design. In some other implementations, controlling physical placement of the design using the state bounds file may include introducing a reduced search space based on the state bounds file after synthesis of the design. These and various other related aspects of controlling physical placement of a design is described in greater detail herein below.

Figure 3A:
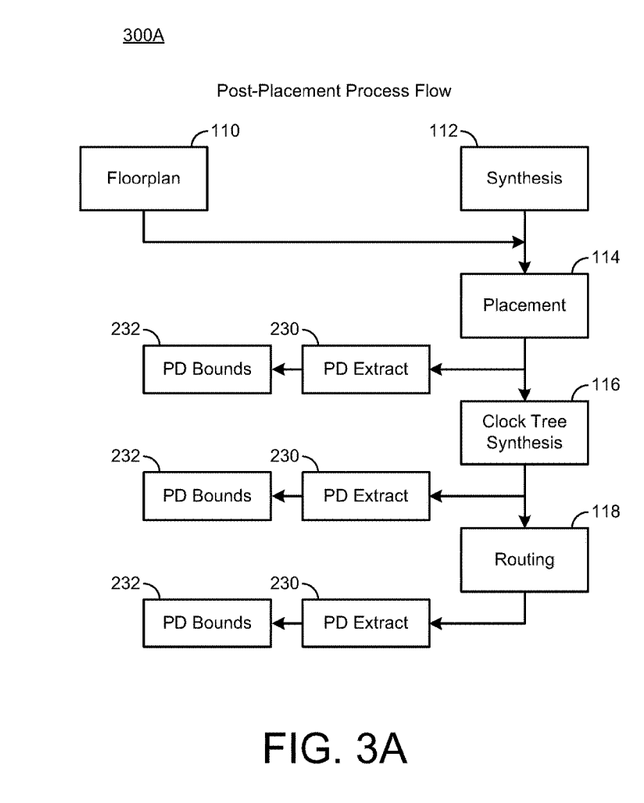
FIGS. 3A-3B illustrate various placement director flow diagrams for physical placement of a design in accordance with various implementations described herein.
Figure 3B:
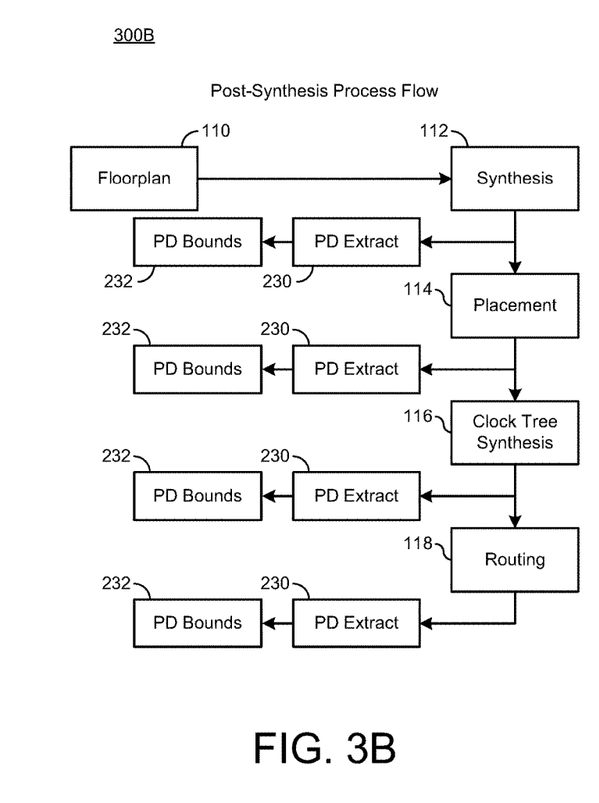

FIGS. 3A-3B illustrate various placement director flow diagrams for physical placement of a design in accordance with various implementations described herein. In particular, FIG. 3A may refer to post-placement process flow 300A for implementing the PD for physical placement of a design, and FIG. 3B may refer to post-synthesis process flow 300B for implementing the PD for physical placement of a design.

In reference to FIG. 3A, the post-placement process flow 300A may refer to a method for controlling physical placement of a design after performing the placement operation 114. For instance, PD extraction 230 and PD bounds generation 232 may be performed after performing the placement operation 114. In some cases, PD extraction 230 and PD bounds generation 232 may be performed after performing the clock tree synthesis operation 116. In other cases, PD extraction 230 and PD bounds generation 232 may be performed after performing the routing operation 118.

In reference to FIG. 3B, the post-synthesis process flow 300B may refer to a method for controlling physical placement of a design after performing the synthesis operation 112. For instance, PD extraction 230 and PD bounds generation 232 may be performed after performing the synthesis operation 112. In some cases, PD extraction 230 and PD bounds generation 232 may be performed after performing the placement operation 114. In other cases, PD extraction 230 and PD bounds generation 232 may be performed after performing the clock tree synthesis operation 116. In some other cases, PD extraction 230 and PD bounds generation 232 may be performed after performing the routing operation 118.

Figure 4:
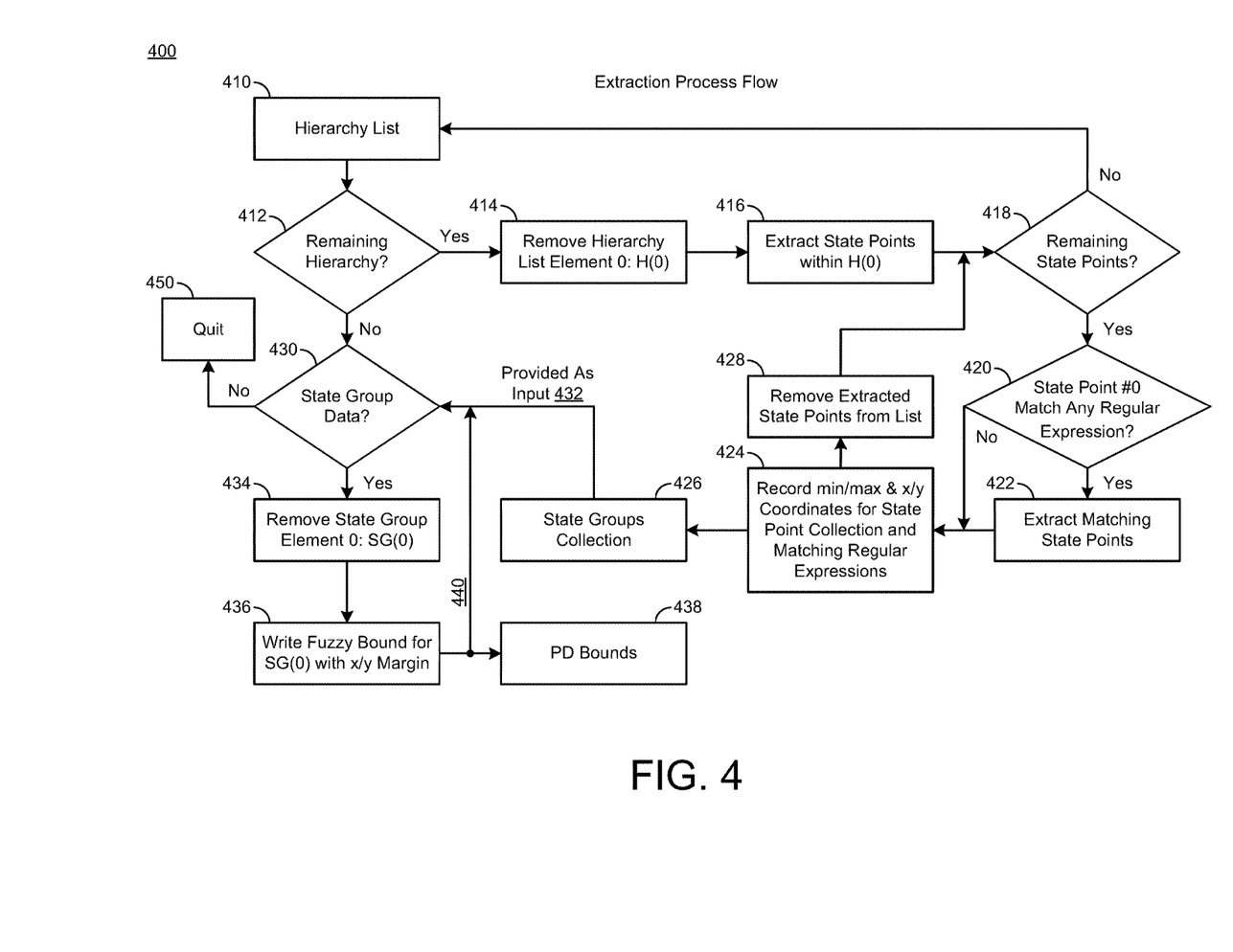
FIG. 4 illustrates a flow diagram for a placement director extraction technique in accordance with various implementations described herein.

FIG. 4 illustrates a process flow diagram for a placement director extraction technique in accordance with various implementations described herein.

In some implementations, the placement director extraction technique refers to a method of iteratively looping through each level of logical hierarchy in the design. At each level, any available state points may be extracted and stored in a collection, such as, e.g., a state bounds collection. For instance, in block 410, a hierarchy list related to a design may be received, obtained, retrieved, etc. In decision block 412, a determination is made as whether any hierarchy elements remain in the hierarchy list. If yes, then in block 414, hierarchy list element 0: H(0) may be removed, and in block 416, any state points provided within hierarchy list element 0: H(0) may be extracted. In decision block 418, a determination is made as to whether any state points remain in the hierarchy list element 0: H(0). If no, then the process returns to block 410. Otherwise, if yes, then in decision block 420, a determination is made as to whether state point #0 matches a regular expression. If no, then the process proceeds to block 424. Otherwise, if yes, then in block 422, any matching state points are extracted, and in block 424, min/max and x/y coordinates may be recorded (collected, stored) for state point collection and for matching regular expressions. In block 426, the extracted state points may be stored in a state groups collection for further processing. Further, in block 428, the extracted state points may be removed from the hierarchy list, and the process proceeds to decision state 418 for iteratively looping through the state points in the hierarchy list until there are no remaining state points to process. Thus, in this instance, if no state points are determined to remain, then the process returns to block 410.

In some implementations, from decision block 412, a determination is made as whether any hierarchy elements remain in the hierarchy list. If no, then in decision block 430, a determination may be made as to whether state group data is present. In some cases, in reference to block 430, the state groups collection may be provided as input 432 from block 426. Further, from decision block 430, if no, then the process proceeds to quit or terminate in block 450. Otherwise, if yes, then in block 434, state group element 0: SG(0) may be removed, and then in block 436, a fuzzy bound for state group element 0: SG(0) with an x/y margin may be written or recorded. Following, in block 438, PD bounds (or state bounds) may be generated in a manner as described herein. Further, as shown, a looped iteration 440 may be implemented from block 436 to block 430, wherein the state groups in the state groups collection may be iterated through when writing out the PD bounds (or state bounds) in block 438. In some cases, this looped iteration 440 may be performed until each of the state groups have been iterated through.

In accordance with various implementations described herein, the placement director (PD) provides for improved placement control via state group bounding. In some cases, the placement director (PD) provides for automatic state grouping, wherein groups of state points that are of interest are defined by, e.g., (u_regbank_\d+_), and extracting these may be used to automatically provide fidelity for control. Further, in some cases, the placement director (PD) provides for state bound generation, wherein precise location of each state point is used to over-constrain a search space, and generating margined min/max bounds for state groups is used to maintain enough control to minimize or at least reduce variance, while providing freedom to enable further refinement. Further, in some cases, the placement director (PD) provides for state bound scaling, wherein by scaling state bounds when moving from one technology or library to another (which may often change placement), a similar placement may be obtained that may enable quicker conversion and thus reduce the impact of placement noise during evaluation.

In various implementations, the placement director (PD) provides an extraction stage that may be configured to loop through each level of logical hierarchy in a design. As described herein, at each level, any available state points may be extracted and stored in a collection. In some cases, state points may be grouped by similarity and stored in a state groups collection alongside grouping terms, wherein grouping terms may refer to expressions or regular expressions that may be used to group similar state points by their instance names. For example, a first instance in the collection may have its base name matched against a selection of regular expressions (reg or regexp), such as, e.g., (.*_reg_\d+_,.*_reg_\d+_\d+_).

Matching instance names, such as, e.g., (u_example_reg_21_) or (u_example2_reg_2_9_)

may be used to generate new regular expressions that extract a state group, such as, e.g., (u_example_reg_\d+_) or (u_example_reg_\d+_\d+_).

The state group regular expression, such as, e.g., (u_example_reg_\d+_)

may be used to remove state points in the group from the initial collection. This regular expression may be recorded along with the hierarchy and the smallest rectangle (or boundary region) that encompasses the entire group, such as, e.g., (lower left x,lower left y,upper right x,upper right y).

In a case of no match against the grouping expressions, such as, e.g., (.*_reg_\d+_), a state group may be generated for a single instance. Hence, the collection of states for this level of hierarchy may be reduced through each loop until the state location data is recorded or stored.

After extraction, the placement director (PD) provides a bound generation stage that may be configured to generate bounds for the collection dataset by looping over the extracted state groups. The hierarchy and regular expressions for state groups may be first combined to form a full state point selection regular expression, such as, e.g., (u_cpu0/u_iside/u_example_\d+_).

This selection expression may be made fuzzy to ensure matches are still made if the implementation is ungrouped. The fuzzy bound may appear as, e.g., (u_cpu0[/_]{1}u_iside[/_]{1}u_example_\d+_).

In some cases, to generate state group bounds, this fuzzy selection expression may be combined with the extracted bounding rectangle plus a user defined margin before being streamed out as a soft instance bound. As the state groups in the collection are looped through, a state bounds file may be generated that defines a general location of each and every state and/or state bound in a design.

When implementing a design, there may be multiple solutions of varying quality, and initially, there may be some gross floor planning choices to be made, such as, e.g., location of memories, ports, etc. However, once these gross floor planning choices have been solidified, an annealing process of finding critical paths and adjusting other critical components, such as, e.g., RTL (Register Transfer Level/ Logic), placement, and cell sizes, may be implemented and undertaken to improve performance.

Sometimes, when small RTL changes are implemented, the gross controls of macro and port placement with hierarchy bounds may be insufficient to ensure that the placement does not change significantly. In some cases, this placement noise may be difficult to determine if the RTL change was positive or if the placement solution was randomly improved. Hence, state bounds may assist with minimizing or at least reducing this variance by ensuring that states are in a similar location between trials.

Further, if the RTL is static, it may be difficult to refine the placement of large designs with macro and port placement. Hierarchy may be useful if it is available at the appropriate level. However, hierarchy may impact the placement of combinational cells, and this restriction may result in a less fluid placement with degraded Quality of Results (QoR), which refers to a term used in evaluating technological processes. Therefore, in accordance with various implementations of the disclosure, state bound driven placement control may allow for fluid combinational cell placement.

If physically aware synthesis is being performed, post-placement state bounds may be streamed-in to assist with minimizing or at least reducing the variance between synthesis and placement. This correlation improvement may enable both synthesis and placement operations to focus on similar problems thereby focusing the annealing and extracting processes for improved performance results.

Another use for state bounds may involve replication of a floorplan using a different technology (e.g., 28 nm to 40 nm, 9 T to 10.5 T, etc.). For instance, in some cases, re-implementing a design with a different technology may result in significant placement changes, thus likely clouding a pure technology comparison.

Therefore, in some cases, how state bounds are used may be dependent on what the implementation engineer is attempting to achieve. However, what state bounds may offer is an ability to reduce run-to-run variance, improve synthesis correlation, control placement at a finer level of granularity (e.g., while being valid for multiple trials), and/or improve technology evaluation.

In some implementations, uses of placement director (PD) may have state bounds generated post-placement, wherein the state bounds may then be used during later trials from synthesis. This iterative refinement of state bounds may be occasionally interrupted by a user deleting bounds in a particular region to thus enable a fresh placement, such as, e.g., expanding a search to escape a local minima or other restriction.

Figure 5:
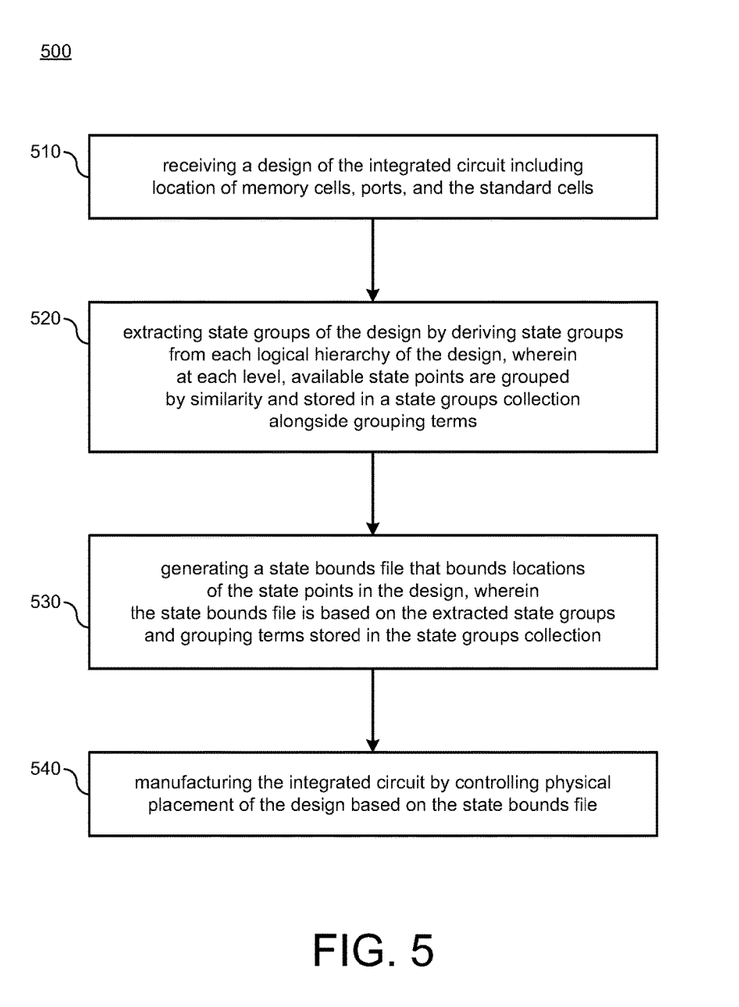
FIG. 5 illustrates a process flow diagram of a method for manufacturing an integrated circuit by controlling physical placement of a design in accordance with various implementations described herein.

FIG. 5 illustrates a process flow diagram of a method 500 for manufacturing an integrated circuit by controlling physical placement of a design, such as, e.g., physical placement of standard cells from a standard cell library, in accordance with various implementations described herein. It should be understood that even though method 500 may indicate a particular order of execution of operations, in some instances, various certain portions of the operations may be executed in a different order, and on different systems. In some other instances, additional operations or steps may be added to and/or omitted from method 500. Further, in some implementations, computing device 700 of FIG. 7 may be configured to perform method 500. In some other implementations, method 500 may be implemented as a program or software instruction process that is configured for controlling physical placement of a design to improve performance.

At block 510, method 500 may receive a design of an integrated circuit including location of memory cells, ports, and/or the standard cells. The ports may be related to the memory cells. The design may include synthesis information related to location of the standard cells in relation to the memory cells and ports. Memory may include Random Access Memory (RAM) or other similar types of memory.

At block 520, method 500 may extract state groups of the design by deriving state groups from each logical hierarchy of the design. At each level, any available state points may be grouped by similarity and may be stored in a collection, such as, e.g., a state groups collection, alongside grouping terms.

At block 530, method 500 may generate a state bounds file that bounds locations of the state points in the design. The state bounds file may be based on the extracted state groups and grouping terms stored in the collection, such as, e.g., the state groups collection. At block 540, method 500 may generate or manufacture the integrated circuit by controlling physical placement of the design based on the state bounds file.

In some implementations, method 500 may synthesize the design including location of standard cells in relation to memory cells and ports. In some cases, extracting state groups of the design may occur prior to synthesis of the design. In other cases, extracting state groups of the design may occur after synthesis of the design.

Further, in some cases, controlling physical placement of the design using the state bounds file may include introducing a reduced search space based on the state bounds file prior to synthesis of the design. In other cases, controlling physical placement of the design using the state bounds file may include introducing a reduced search space based on the state bounds file after synthesis of the design.

Figure 6:
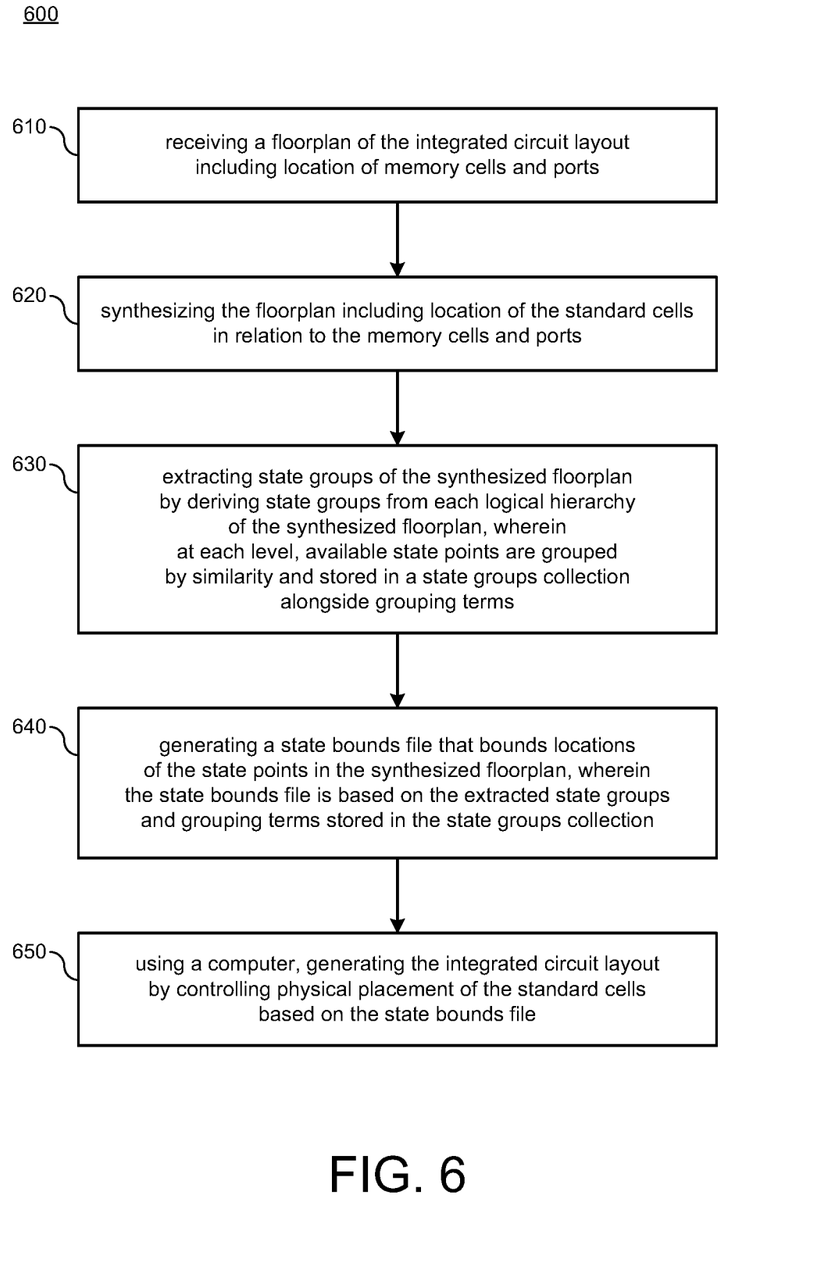
FIG. 6 illustrates a process flow diagram of a method for controlling physical placement of a design, such as, e.g., physical placement of standard cells from a standard cell library, in accordance with various implementations described herein.

FIG. 6 illustrates a process flow diagram of a method 600 for controlling physical placement of a design, such as, e.g., physical placement of standard cells from a standard cell library, in accordance with various implementations described herein. In some implementations, the method 600 of FIG. 6 may refer to a computer-implemented method of controlling physical placement of a plurality of standard cells when generating an integrated circuit layout using a standard cell library that defines functional components of each standard cell for implementing the integrated circuit layout.

It should be understood that even though method 600 may indicate a particular order of execution of operations, in some instances, various certain portions of the operations may be executed in a different order, and on different systems. In some other instances, additional operations or steps may be added to and/or omitted from method 600. In some implementations, computing device 700 of FIG. 7 may be configured to perform method 600. In some other implementations, method 600 may be implemented as a program or software instruction process that is configured for controlling physical placement of a design to improve performance.

At block 610, method 600 may receive a floorplan of the integrated circuit layout including location of memory cells and ports. At block 620, method 600 may synthesize the floorplan including location of the standard cells in relation to the memory cells and ports. In some cases, synthesizing the floorplan may include one or more of identifying critical paths, adjusting register transfer level or logic (RTL), and determining standard cell sizes. At block 630, method 600 may extract state groups of the synthesized floorplan by deriving state groups from each logical hierarchy of the synthesized floorplan. In some cases, at each level, any available state points may be grouped by similarity and stored in a state groups collection alongside grouping terms. At block 640, method 600 may generate a state bounds file that bounds locations of the state points in the synthesized floorplan. In some cases, the state bounds file may be based on the extracted state groups and grouping terms stored in the state groups collection. At block 650, method 600 may use a computer to generate the integrated circuit layout by controlling physical placement of the standard cells based on the state bounds file.

In some implementations, method 600 may re-synthesize the floorplan based on the state bounds file, e.g., after generating the state bounds file. The re-synthesized floorplan may include location of the standard cells in relation to the memory cells and ports based on the state bounds file. Further, method 600 may include using a computer to generate the integrated circuit layout by controlling physical placement of the standard cells based on the re-synthesized floorplan and the state bounds file.

In other implementations, method 600 may determine routing connections between the standard cells in reference to the physical placement of the standard cells based on the state bounds file. Further, method 600 may use a computer to generate the integrated circuit layout by controlling physical placement of the standard cells based on the routing connections and the state bounds file.

In some other implementations, method 600 may re-synthesize the floorplan and determine routing connections between the standard cells in reference to the physical placement of the standard cells based on the state bounds file. Further, method 600 may use a computer to generate the integrated circuit layout by controlling physical placement of the standard cells based on the re-synthesized floorplan, the routing connections, and the state bounds file.

Figure 7:
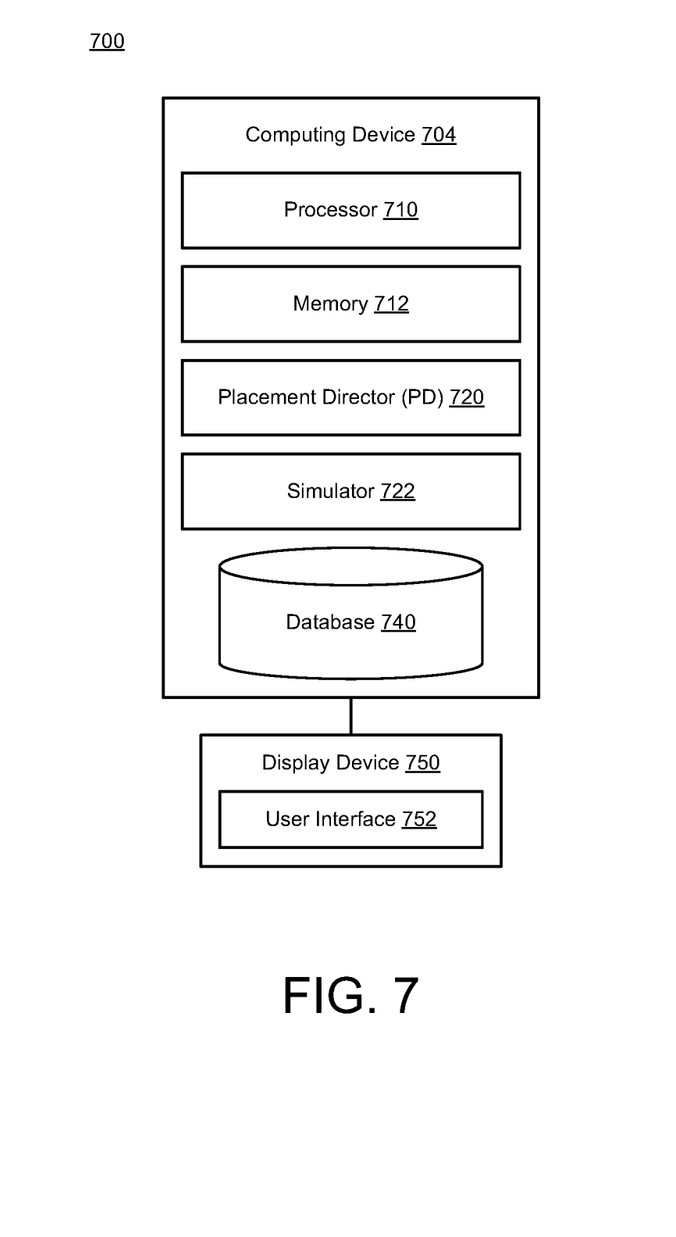
FIG. 7 illustrates a diagram of a system for controlling physical placement of a design in accordance with various implementations described herein.

FIG. 7 illustrates a diagram of a system 700 for controlling physical placement of a design in accordance with various implementations described herein. The system 700 may be configured for generating, fabricating, and/or manufacturing an integrated circuit by controlling physical placement of standard cells from a standard cell library in accordance with various implementations described herein.

In reference to FIG. 7, the system 700 may include a computer based system configured for controlling physical placement of a design. Further, the system 700 may be associated with at least one computing device 704 that may be implemented as a special purpose machine configured for controlling physical placement of a design. In some implementations, the computing device 704 may include any standard element(s) and/or component(s), including at least one processor(s) 710, memory 712 (e.g., non-transitory computer-readable storage medium), one or more database(s) 740, power, peripherals, and various other computing elements and/or components that may not be specifically shown in FIG. 7. The computing device 704 may include instructions stored on the non-transitory computer-readable medium 712 that are executable by the at least one processor 710, and as such, the instructions may cause the at least one processor 710 to perform various implementations of methods described herein.

Further, the computing device 704 may be associated with a display device 750 (e.g., monitor or other display) that may be used to provide a user interface (UI) 752, such as, e.g., a graphical user interface (GUI). In some instances, the UI 752 may be used to receive various parameters and/or preferences from a user for managing, operating, and/or utilizing the computing device 704. As such, the computing device 704 may include the display device 750 for providing output to a user, and the display device 750 may include the UI 752 for receiving input from the user.

As described herein, the system 700 may be implemented as a special purpose machine configured for controlling physical placement of a design. In some cases, the system 700 may be implemented as a special purpose machine configured for generating, fabricating, and/or manufacturing an integrated circuit by controlling physical placement of standard cells from a standard cell library. In some cases, the system 700 may be implemented as a special purpose machine configured for generating an integrated circuit using electronic design automation (EDA), and thus, the system 700 may be implemented as an EDA system for designing an integrated circuit. Further, in some other cases, the system 700 may be implemented as a special purpose machine configured for controlling physical placement of a plurality of standard cells when generating an integrated circuit layout using a standard cell library that defines functional components of each standard cell for implementing the integrated circuit layout.

In various implementations, the computing device 704 may be configured to implement various methodologies and/or techniques for controlling physical placement of a design. For instance, the computing device 704 may be configured to analyze operating conditions for cells of an integrated circuit. In reference to FIG. 7, the computing device 704 may include a placement director (PD) 720 (or performance optimizer) configured to cause the at least one processor 710 to implement one or more techniques described in reference to FIGS. 2A-6, including techniques related to controlling physical placement of a design. The placement director (PD) 720 may be implemented in hardware and/or software, and the PD 720 may be referred to as a module. If implemented in software, the placement director (PD) 720 may be stored in memory 712 and/or database 740. If implemented in hardware, the placement director (PD) 720 may be a separate processing component configured to interface with the processor 710.

In some implementations, the placement director (PD) 720 may be configured to cause the at least one processor 710 to perform various techniques, as described herein in reference to FIGS. 2A-6. For instance, the placement director (PD) 720 may be configured to cause the at least one processor 710 to analyze operating conditions for a design of an integrated circuit. The placement director (PD) 720 may be configured to further cause the at least one processor 710 to assist with generating, fabricating, and/or manufacturing an integrated circuit design as described in reference to FIGS. 2A-6.

In some implementations, the placement director (PD) 720 may have access to various electronic design automation (EDA) tools and/or engines, such as, e.g., synthesis, placement, clock tree synthesis, and/or routing related tools and/or engines. As such, the PD 720 may be configured to implement methods for manufacturing an integrated circuit by controlling physical placement of standard cells from a standard cell library. Further, the PD 720 may be configured for generating an integrated circuit using electronic design automation (EDA). Further, the PD 720 may be configured to implement electronic design automation (EDA) methods for designing an integrated circuit.

In reference to methods of FIGS. 2A-4, the placement director (PD) 720 may be configured to cause the at least one processor 710 to extract state groups of the design by deriving state groups from each logical hierarchy of the design, wherein at each level, available state points are grouped by similarity and stored in a state groups collection alongside grouping terms. Further, the PD 720 may be configured to cause the at least one processor 710 to generate a state bounds file that bounds locations of the state points in the design, wherein the state bounds file is based on the extracted state groups and grouping terms stored in the state groups collection. Still further, the PD 720 may be configured to cause the at least one processor 710 to control physical placement of the design using the state bounds file.

In reference to method 500 of FIG. 5, the placement director (PD) 720 may be configured to cause the at least one processor 710 to receive a design of an integrated circuit including location of memory cells, ports, and the standard cells. Further, the PD 720 may be configured to cause the at least one processor 710 to extract state groups of the design by deriving state groups from each logical hierarchy of the design, wherein at each level, available state points are grouped by similarity and stored in a state groups collection alongside grouping terms. Further, the PD 720 may be configured to cause the at least one processor 710 to generate a state bounds file that bounds locations of the state points in the design, wherein the state bounds file is based on the extracted state groups and grouping terms stored in the state groups collection. Further, the PD 720 may be configured to cause the at least one processor 710 to generate, fabricate, and/or manufacture the integrated circuit by controlling physical placement of the design based on the state bounds file.

In reference to method 600 of FIG. 6, the placement director (PD) 720 may be configured to cause the at least one processor 710 to receive a floorplan of an integrated circuit layout including location of memory cells and ports. Further, the PD 720 may be configured to cause the at least one processor 710 to synthesize the floorplan including location of the standard cells in relation to the memory cells and ports. Further, the PD 720 may be configured to cause the at least one processor 710 to extract state groups of the synthesized floorplan by deriving state groups from each logical hierarchy of the synthesized floorplan, wherein at each level, available state points are grouped by similarity and stored in a state groups collection alongside grouping terms. Further, the PD 720 may be configured to cause the at least one processor 710 to generate a state bounds file that bounds locations of the state points in the synthesized floorplan, wherein the state bounds file is based on the extracted state groups and grouping terms stored in the state groups collection. Further, the PD 720 may be configured to cause the at least one processor 710 to generate the integrated circuit layout by controlling physical placement of the standard cells based on the state bounds file.

Moreover, the computing device 704 may include a simulator 722 configured to cause the at least one processor 710 to generate one or more simulations of an integrated circuit. The simulator 722 may be implemented in hardware and/or software, and the simulator 722 may be referred to as a module. If implemented in software, the simulator 722 may be stored in memory 712 or database 740. If implemented in hardware, the simulator 722 may be a separate processing component configured to interface with the processor 710. In some instances, the simulator 722 may include a SPICE simulator configured to generate SPICE simulations of the integrated circuit. Generally, SPICE refers to an acronym for Simulation Program with Integrated Circuit Emphasis, which is an open source analog electronic circuit simulator. Further, SPICE is a general-purpose software program used by the semiconductor industry to check the integrity of integrated circuit designs and to predict the behavior of integrated circuit designs. Accordingly, in some instances, the placement director (PD) 720 may be configured to interface with the simulator 722 to generate timing data based on one or more simulations (e.g., SPICE simulations) of an integrated circuit that may be used for analyzing the timing data of the integrated circuit to identify instances of timing degradation. Further, in some cases, the placement director (PD) 720 may be configured to use the one or more simulations (e.g., SPICE simulations) of an integrated circuit for controlling physical placement of a design having improved performance, as described herein.

In some implementations, the computing device 704 may include one or more databases 740 configured to store and/or record various information related to controlling physical placement of a design. In some cases, the database(s) 740 may be configured to store and/or record information related to the integrated circuit, operating conditions, and/or timing data. Further, the database(s) 740 may be configured to store and/or record information related to the integrated circuit and timing data in reference to simulation data (including, e.g., SPICE simulation data).

Described herein are various implementations of a method for controlling physical placement of a circuit design. In some implementations, the method may include extracting state groups of the circuit design by deriving state groups from each logical hierarchy of the circuit design. At each level, available state points may be grouped by similarity and stored in a state groups collection alongside grouping terms. The method may include generating a state bounds file that bounds locations of the state points in the circuit design. The state bounds file may be based on the extracted state groups and the grouping terms stored in the state groups collection. The method may include controlling physical placement of the circuit design using the state bounds file.

Described herein are various implementations of a system for controlling physical placement of a circuit design. In some implementations, the system may include a processor and memory having instructions stored thereon that, when executed by the processor, cause the processor to extract state groups of the circuit design by deriving state groups from each logical hierarchy of the circuit design. At each level, available state points may be grouped by similarity and stored in a state groups collection alongside grouping terms. The instructions may cause the processor to generate a state bounds file that bounds locations of the state points in the circuit design. The state bounds file may be based on the extracted state groups and the grouping terms stored in the state groups collection. The instructions may cause the processor to control physical placement of the circuit design using the state bounds file.

Described herein are various implementations of a non-transitory computer-readable medium having stored thereon computer-executable instructions which, when executed by a computer, cause the computer to control physical placement of a circuit design. The computer-executable instructions may further cause the computer to extract state groups of the circuit design by deriving state groups from each logical hierarchy of the circuit design. At each level, available state points may be grouped by similarity and stored in a state groups collection alongside grouping terms. The computer-executable instructions may further cause the computer to generate a state bounds file that bounds locations of the state points in the circuit design. The state bounds file may be based on the extracted state groups and the grouping terms stored in the state groups collection. The computer-executable instructions may further cause the computer to control physical placement of the circuit design using the state bounds file.

Described herein are various implementations of a method of manufacturing an integrated circuit. In some implementations, the method may include receiving a design of the integrated circuit including location of memory cells, ports, and the standard cells. The method may include extracting state groups of the design by deriving state groups from each logical hierarchy of the design. At each level, available state points may be grouped by similarity and stored in a state groups collection alongside grouping terms. The method may include generating a state bounds file that bounds locations of the state points in the design. The state bounds file may be based on the extracted state groups and the grouping terms stored in the state groups collection. The method may include manufacturing the integrated circuit by controlling physical placement of the design based on the state bounds file.

Described herein are various implementations of a system for manufacturing an integrated circuit. In some implementations, the system may include a processor and memory having instructions stored thereon that, when executed by the processor, cause the processor to receive a design of the integrated circuit including location of memory cells, ports, and the standard cells. The instructions may further cause the processor to extract state groups of the design by deriving state groups from each logical hierarchy of the design. At each level, available state points may be grouped by similarity and stored in a state groups collection alongside grouping terms. The instructions may further cause the processor to generate a state bounds file that bounds locations of the state points in the design. The state bounds file may be based on the extracted state groups and the grouping terms stored in the state groups collection. The instructions may further cause the processor to manufacture the integrated circuit by controlling physical placement of the design based on the state bounds file.

Described herein are various implementations of a method of generating an integrated circuit using electronic design automation (EDA). In some implementations, the method may include extracting state groups of the integrated circuit by deriving state groups from each logical hierarchy of the integrated circuit. At each level, available state points may be grouped by similarity and stored in a state groups collection alongside grouping terms. The method may include generating a state bounds file that bounds locations of the state points in the integrated circuit. The state bounds file may be based on the extracted state groups and the grouping terms stored in the state groups collection. The method may include, using EDA, generating the integrated circuit by controlling physical placement of the integrated circuit based on the state bounds file.

Described herein are various implementations of a system for generating an integrated circuit using electronic design automation (EDA). In some implementations, the system may include a processor and memory having instructions stored thereon that, when executed by the processor, cause the processor to extract state groups of the integrated circuit by deriving state groups from each logical hierarchy of the integrated circuit. At each level, available state points may be grouped by similarity and stored in a state groups collection alongside grouping terms. The instructions mat further cause the processor to generate a state bounds file that bounds locations of the state points in the integrated circuit. The state bounds file may be based on the extracted state groups and the grouping terms stored in the state groups collection. The instructions mat further cause the processor to, using EDA, generate the integrated circuit by controlling physical placement of the integrated circuit based on the state bounds file.

Described herein are various implementations of an electronic design automation (EDA) method for designing an integrated circuit. In some implementations, the EDA method may include extracting state groups of the integrated circuit by deriving state groups from each logical hierarchy of the integrated circuit. At each level, available state points may be grouped by similarity and stored in a state groups collection alongside grouping terms. The EDA method may include generating a state bounds file that bounds locations of the state points in the integrated circuit. The state bounds file may be based on the extracted state groups and the grouping terms stored in the state groups collection. The EDA method may include designing a layout for the integrated circuit by controlling physical placement of the integrated circuit using the state bounds file.

Described herein are various implementations of an electronic design automation (EDA) system for designing an integrated circuit. In some implementations, the EDA system may include a processor and memory having instructions stored thereon that, when executed by the processor, cause the processor to extract state groups of the integrated circuit by deriving state groups from each logical hierarchy of the integrated circuit. At each level, available state points may be grouped by similarity and stored in a state groups collection alongside grouping terms. The instructions may further cause the processor to generate a state bounds file that bounds locations of the state points in the integrated circuit. The state bounds file may be based on the extracted state groups and the grouping terms stored in the state groups collection. The instructions may further cause the processor to design a layout for the integrated circuit by controlling physical placement of the integrated circuit using the state bounds file.

Described herein are various implementations of a computer-implemented method of controlling physical placement of a plurality of standard cells when generating an integrated circuit layout using a standard cell library that defines functional components of each standard cell for implementing the integrated circuit layout. The method may include receiving a floorplan of the integrated circuit layout including location of memory cells and ports and synthesizing the floorplan including location of the standard cells in relation to the memory cells and ports. The method may include extracting state groups of the synthesized floorplan by deriving state groups from each logical hierarchy of the synthesized floorplan. At each level, available state points may be grouped by similarity and stored in a state groups collection alongside grouping terms. The method may include generating a state bounds file that bounds locations of the state points in the synthesized floorplan. The state bounds file may be based on the extracted state groups and the grouping terms stored in the state groups collection. The method may include, using a computer, generating the integrated circuit layout by controlling physical placement of the standard cells based on the state bounds file.

Described herein are various implementations of a system for controlling physical placement of a plurality of standard cells when generating an integrated circuit layout using a standard cell library that defines functional components of each standard cell for implementing the integrated circuit layout. The system may include a processor and memory having instructions stored thereon that, when executed by the processor, cause the processor to receive a floorplan of the integrated circuit layout including location of memory cells and ports and synthesize the floorplan including location of the standard cells in relation to the memory cells and ports. The instructions may further cause the processor to extract state groups of the synthesized floorplan by deriving state groups from each logical hierarchy of the synthesized floorplan. At each level, available state points may be grouped by similarity and stored in a state groups collection alongside grouping terms. The instructions may further cause the processor to generate a state bounds file that bounds locations of the state points in the synthesized floorplan. The state bounds file may be based on the extracted state groups and the grouping terms stored in the state groups collection. The instructions may further cause the processor to generate the integrated circuit layout by controlling physical placement of the standard cells based on the state bounds file.

Implementations of various technologies described herein may be operational with numerous general purpose or special purpose computing system environments or configurations. Examples of computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, smart phones, tablets, wearable computers, cloud computing systems, virtual computers, marine electronics devices, and the like.

The various technologies described herein may be implemented in the general context of computer-executable instructions, such as program modules, being executed by a computer. Program modules include routines, programs, objects, components, data structures, etc. that perform particular tasks or implement particular abstract data types. Further, each program module may be implemented in its own way, and all need not be implemented the same way. While program modules may execute on a single computing system, it should be appreciated that, in some implementations, program modules may be implemented on separate computing systems or devices adapted to communicate with one another. A program module may also be some combination of hardware and software where particular tasks performed by the program module may be done either through hardware, software, or some combination of both.

The various technologies described herein may be implemented in distributed computing environments where tasks are performed by remote processing devices that are linked through a communications network, e.g., by hardwired links, wireless links, or various combinations thereof. In a distributed computing environment, program modules may be located in both local and remote computer storage media including, for example, memory storage devices and similar.

Further, the discussion provided herein may be considered directed to certain specific implementations. It should be understood that the discussion provided herein is provided for the purpose of enabling a person with ordinary skill in the art to make and use any subject matter defined herein by the subject matter of the claims.

It should be intended that the subject matter of the claims not be limited to the implementations and illustrations provided herein, but include modified forms of those implementations including portions of implementations and combinations of elements of different implementations in accordance with the claims. It should be appreciated that in the development of any such implementation, as in any engineering or design project, numerous implementation-specific decisions should be made to achieve developers' specific goals, such as compliance with system-related and business related constraints, which may vary from one implementation to another. Moreover, it should be appreciated that such a development effort may be complex and time consuming, but would nevertheless be a routine undertaking of design, fabrication, and manufacture for those of ordinary skill having benefit of this disclosure.

Reference has been made in detail to various implementations, examples of which are illustrated in the accompanying drawings and figures. In the following detailed description, numerous specific details are set forth to provide a thorough understanding of the disclosure provided herein. However, the disclosure provided herein may be practiced without these specific details. In some other instances, well-known methods, procedures, components, circuits and networks have not been described in detail so as not to unnecessarily obscure details of the embodiments.

It should also be understood that, although the terms first, second, etc. may be used herein to describe various elements, these elements should not be limited by these terms. These terms are only used to distinguish one element from another. For example, a first element could be termed a second element, and, similarly, a second element could be termed a first element. The first element and the second element are both elements, respectively, but they are not to be considered the same element.

The terminology used in the description of the disclosure provided herein is for the purpose of describing particular implementations and is not intended to limit the disclosure provided herein. As used in the description of the disclosure provided herein and appended claims, the singular forms "a," "an," and "the" are intended to include the plural forms as well, unless the context clearly indicates otherwise. The term "and/or" as used herein refers to and encompasses any and all possible combinations of one or more of the associated listed items. The terms "includes," "including," "comprises," and/or "comprising," when used in this specification, specify a presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. The terms "up" and "down"; "upper" and "lower"; "upwardly" and "downwardly"; "below" and "above"; and other similar terms indicating relative positions above or below a given point or element may be used in connection with some implementations of various technologies described herein.

While the foregoing is directed to implementations of various techniques described herein, other and further implementations may be devised in accordance with the disclosure herein, which may be determined by the claims that follow.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
    extracting state groups of a circuit design by deriving state groups from each logical hierarchy of the circuit design, wherein at each level, available state points are grouped by similarity and stored in a state groups collection alongside grouping terms;
    generating a state bounds file that bounds locations of the state points in the circuit design, wherein the state bounds file is based on the extracted state groups and the grouping terms stored in the state groups collection; and
    generating an integrated circuit layout by controlling physical placement of the circuit design using the state bounds file.

2. The method of claim 1, wherein the circuit design comprises a floorplan of the integrated circuit layout of memory, ports, and standard cells selected from a standard cell library.

3. The method of claim 1, wherein the state groups are automatically derived from each logical hierarchy of the circuit design.

4. The method of claim 1, wherein the state points refer to start and stop points of cells configured to hold state values, and wherein the cells include registers.

5. The method of claim 1, wherein the grouping terms comprise instance names of regular expressions.

6. The method of claim 1, wherein extracting the state groups of the circuit design includes iterating through each level of each logical hierarchy of the circuit design so as to derive the state groups from each logical hierarchy of the circuit design.

7. The method of claim 1, wherein generating the state bounds file includes iterating through the extracted state groups in the state groups collection so as to generate state group bounds for bounding the locations of the state points in the circuit design.

8. The method of claim 1, wherein generating the state bounds file includes iterating through the extracted state groups in the state groups collection so as to reduce the state group collection by removing redundant state points.

9. The method of claim 8, wherein reducing the state groups collection includes:
    matching instance names in the state groups collection with selections of regular expressions;
    using the matched instance names to generate grouping expressions for extracting the state groups;
    using the selected regular expressions to remove redundant state points in each state group from the state groups collection;
    generating a state group for a single instance if no match exists with the grouping expressions; and
    storing the regular expression along with the logical hierarchy.

10. The method of claim 1, wherein controlling physical placement of the circuit design using the state bounds file includes introducing a reduced search space for the available state points that are grouped by similarity and stored in the state groups collection based on the state bounds file prior to synthesis of the circuit design.

11. The method of claim 1, wherein controlling physical placement of the circuit design using the state bounds file includes introducing a reduced search space for the available state points that are grouped by similarity and stored in the state groups collection based on the state bounds file after synthesis of the circuit design.

12. A method of manufacturing an integrated circuit, the method comprising:
    receiving a design of the integrated circuit including location of memory cells, ports, and the standard cells;
    extracting state groups of the design by deriving state groups from each logical hierarchy of the design, wherein at each level, available state points are grouped by similarity and stored in a state groups collection alongside grouping terms;
    generating a state bounds file that bounds locations of the state points in the design, wherein the state bounds file is based on the extracted state groups and the grouping terms stored in the state groups collection; and
    manufacturing the integrated circuit by controlling physical placement of the design based on the state bounds file.

13. The method of claim 12, wherein the ports are related to the memory cells, and wherein the design includes synthesis information related to location of the standard cells in relation to the memory cells and ports.

14. The method of claim 12, further comprising synthesizing the design including location of the standard cells in relation to the memory cells and ports.

15. The method of claim 14, wherein extracting the state groups of the design occurs prior to synthesis of the design.

16. The method of claim 14, wherein extracting the state groups of the design occurs after synthesis of the design.

17. The method of claim 14, wherein controlling physical placement of the design based on the state bounds file includes introducing a reduced search space for the available state points that are grouped by similarity and stored in the state groups collection based on the state bounds file prior to synthesis of the design.

18. The method of claim 14, wherein controlling physical placement of the design based on the state bounds file includes introducing a reduced search space for the available state points that are grouped by similarity and stored in the state groups collection based on the state bounds file after synthesis of the design.

19. A computer-implemented method of controlling physical placement of a plurality of standard cells when generating an integrated circuit layout using a standard cell library that defines functional components of each standard cell for implementing the integrated circuit layout, the method comprising:
    receiving a floorplan of the integrated circuit layout including location of memory cells and ports;
    synthesizing the floorplan including location of the standard cells in relation to the memory cells and ports;
    extracting state groups of the synthesized floorplan by deriving state groups from each logical hierarchy of the synthesized floorplan, wherein at each level, available state points are grouped by similarity and stored in a state groups collection alongside grouping terms;

generating a state bounds file that bounds locations of the state points in the synthesized floorplan, wherein the state bounds file is based on the extracted state groups and the grouping terms stored in the state groups collection; and using a computer, generating the integrated circuit layout by controlling physical placement of the standard cells based on the state bounds file.

20. The method of claim 19, wherein synthesizing the floorplan includes one or more of identifying critical paths, adjusting register transfer level or logic (RTL), and determining standard cell sizes.

21. The method of claim 19, further comprising:

after generating the state bounds file, re-synthesizing the floorplan based on the state bounds file, wherein the re-synthesized floorplan includes location of the standard cells in relation to the memory cells and ports based on the state bounds file; and using the computer, generating the integrated circuit layout by controlling physical placement of the standard cells based on the re-synthesized floorplan and the state bounds file.

22. The method of claim 19, further comprising:

determining routing connections between the standard cells in reference to the physical placement of the standard cells based on the state bounds file; and using the computer, generating the integrated circuit layout by controlling physical placement of the standard cells based on the routing connections and the state bounds file.

23. The method of claim 19, further comprising:

after generating the state bounds file, re-synthesizing the floorplan based on the state bounds file, wherein the re-synthesized floorplan includes location of the standard cells in relation to the memory cells and ports based on the state bounds file;

determining routing connections between the standard cells in reference to the physical placement of the standard cells based on the state bounds file; and using the computer, generating the integrated circuit layout by controlling physical placement of the standard cells based on the re-synthesized floorplan, the routing connections, and the state bounds file.

24. A system for controlling physical placement of a plurality of standard cells when generating an integrated circuit layout using a standard cell library that defines functional components of each standard cell for implementing the integrated circuit layout, the system comprising:

a processor; and memory having instructions stored thereon that, when executed by the processor, cause the processor to:

receive a floorplan of the integrated circuit layout including location of memory cells and ports;

synthesize the floorplan including location of the standard cells in relation to the memory cells and ports;

extract state groups of the synthesized floorplan by deriving state groups from each logical hierarchy of the synthesized floorplan, wherein at each level, available state points are grouped by similarity and stored in a state groups collection alongside grouping terms;

generate a state bounds file that bounds locations of the state points in the synthesized floorplan, wherein the state bounds file is based on the extracted state groups and the grouping terms stored in the state groups collection; and generate the integrated circuit layout by controlling physical placement of the standard cells based on the state bounds file.

* * * * *